April 21, 1970  L. J. RYLAND  3,507,375
FLUID OPERATED CLUTCH WITH DISC SPRINGS
Original Filed June 22, 1967  6 Sheets-Sheet 5

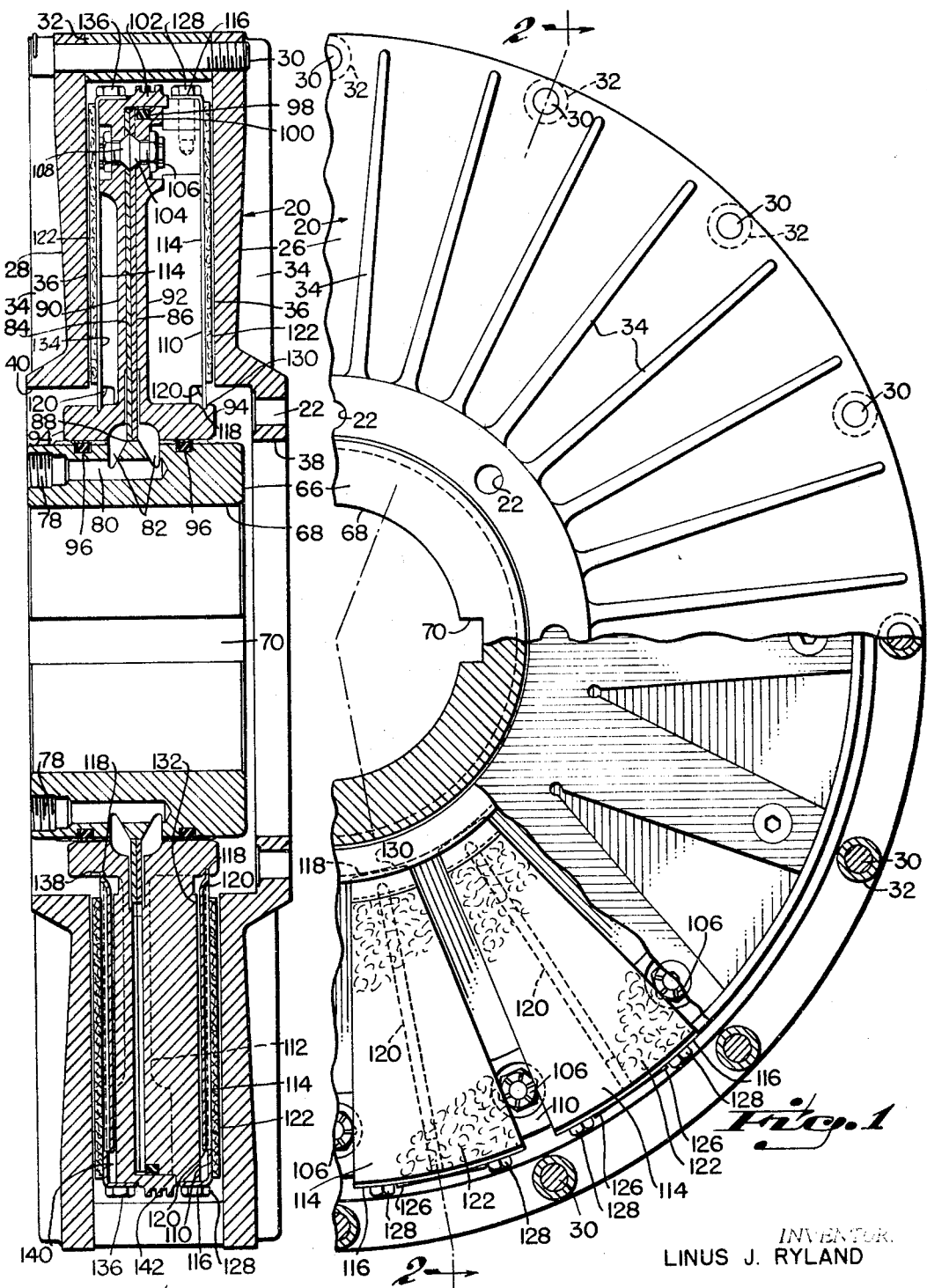

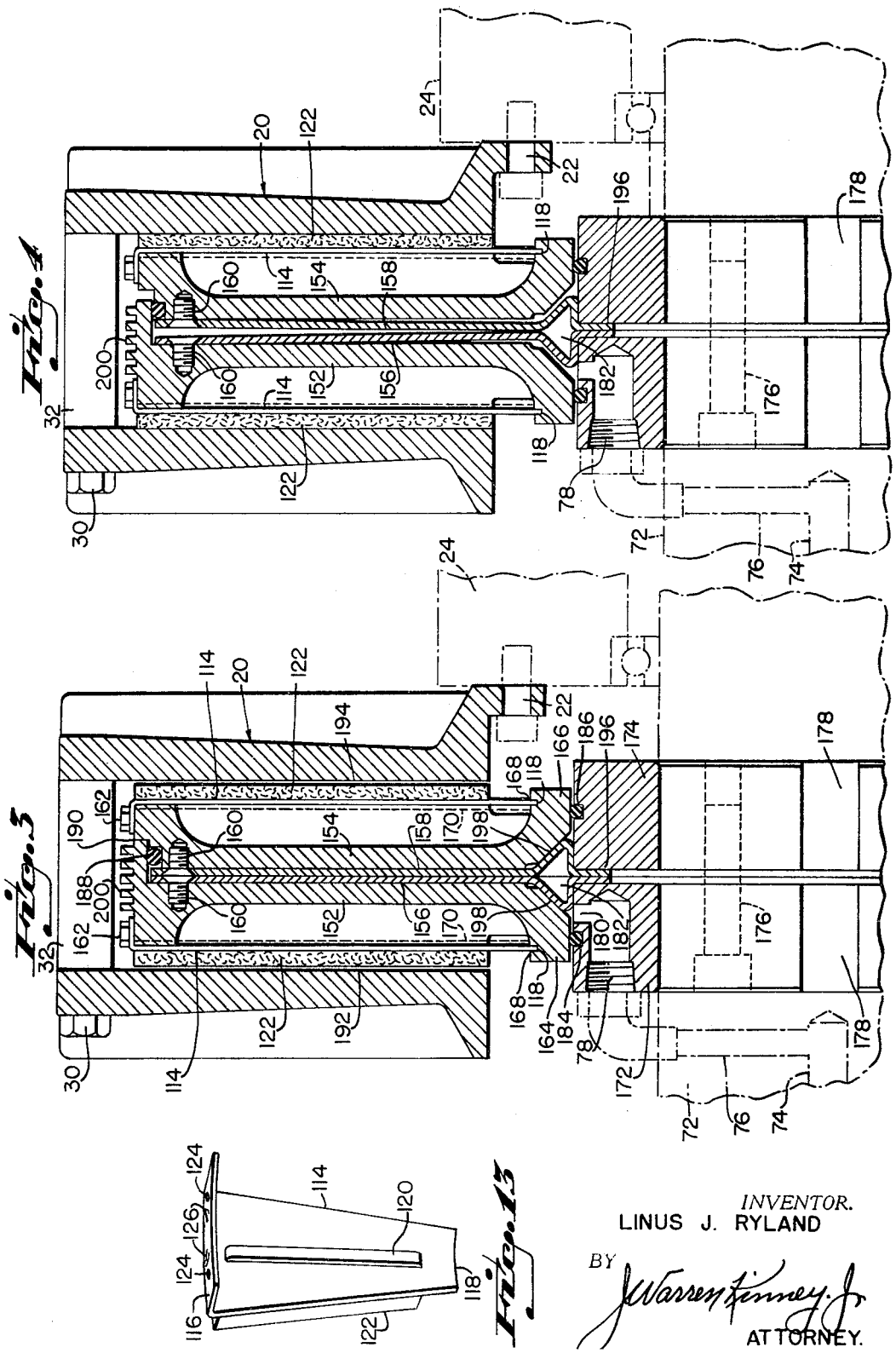

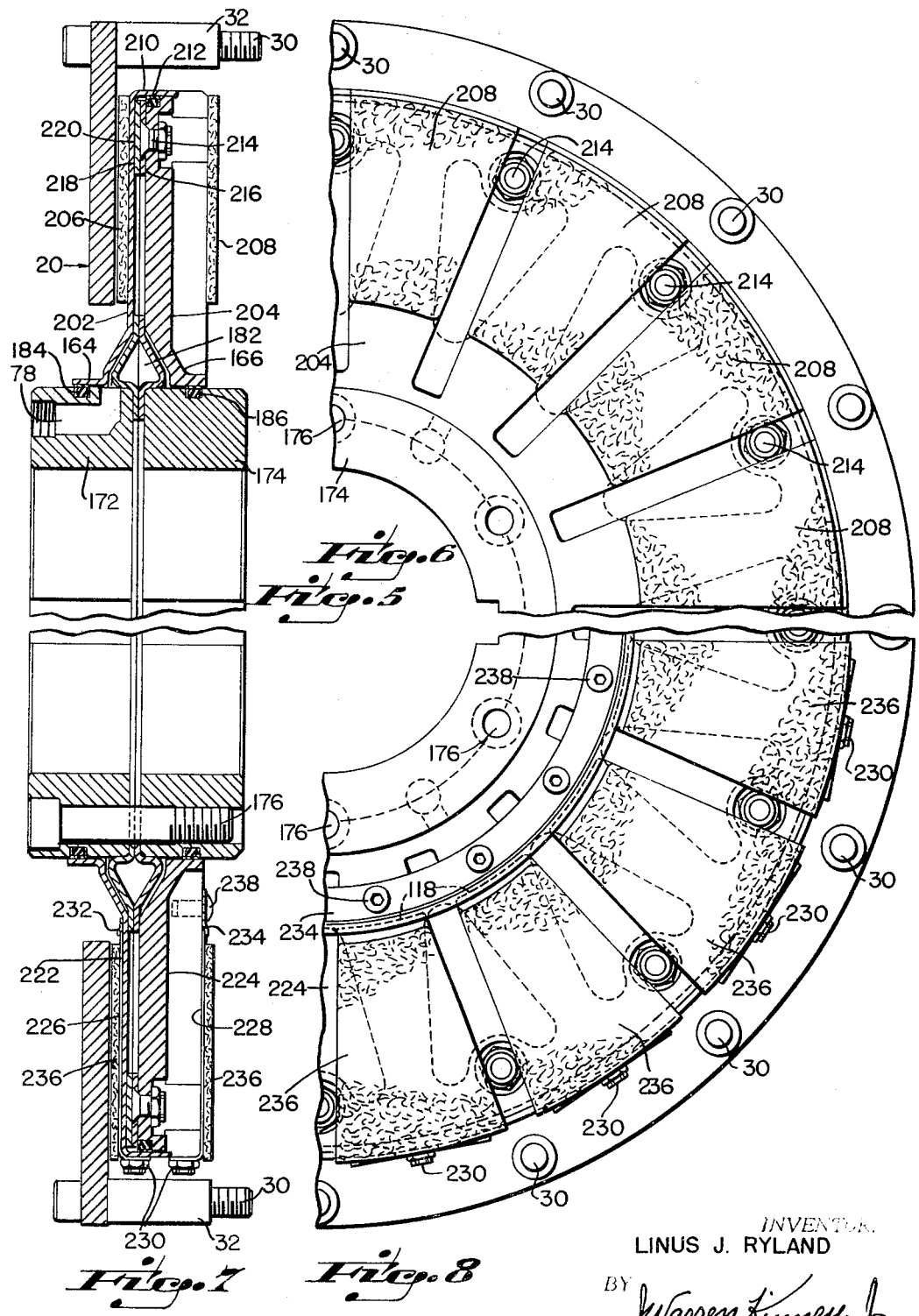

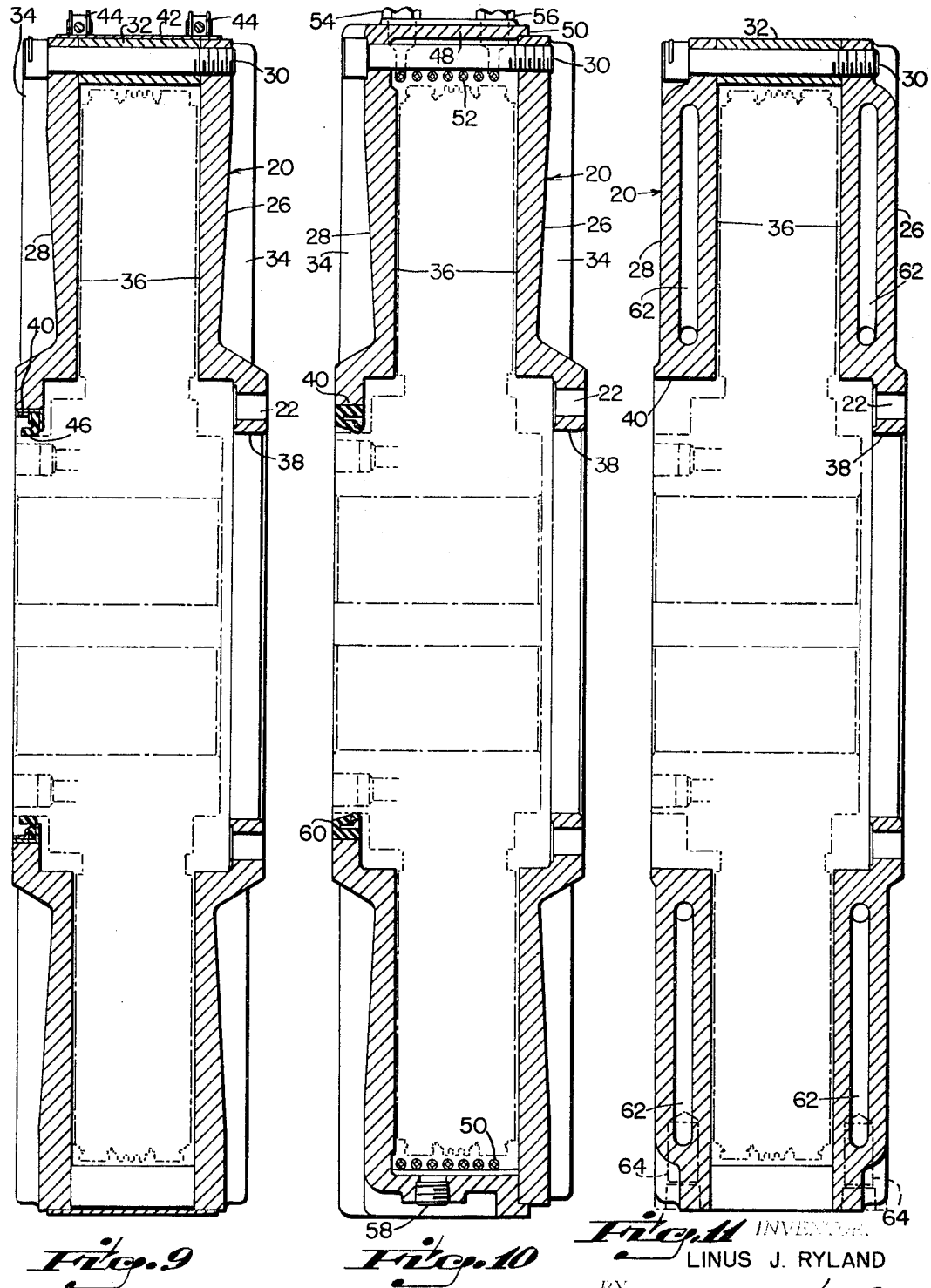

INVENTOR.
LINUS J. RYLAND
BY
Warren Kinney Jr.
ATTORNEY

April 21, 1970  L. J. RYLAND  3,507,375
FLUID OPERATED CLUTCH WITH DISC SPRINGS
Original Filed June 22, 1967  6 Sheets-Sheet 6
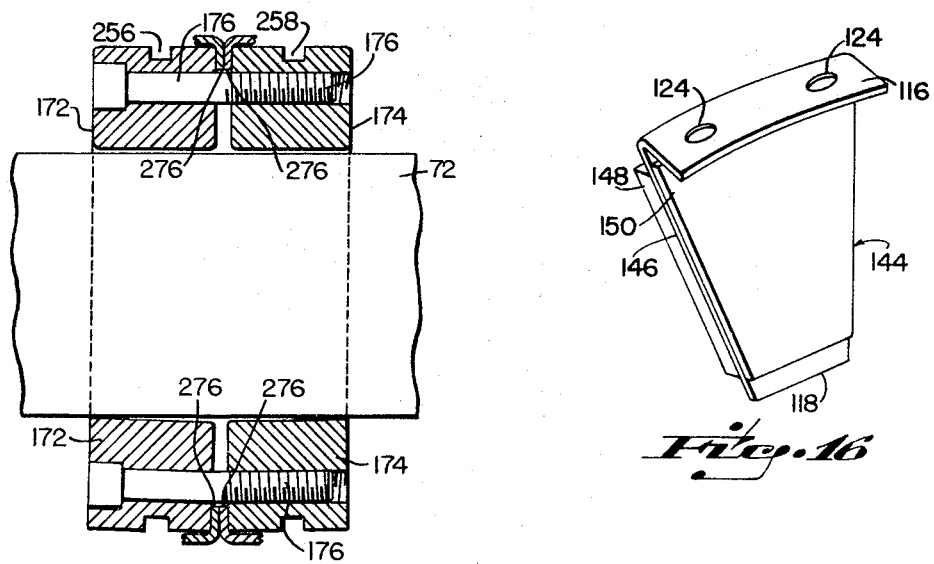
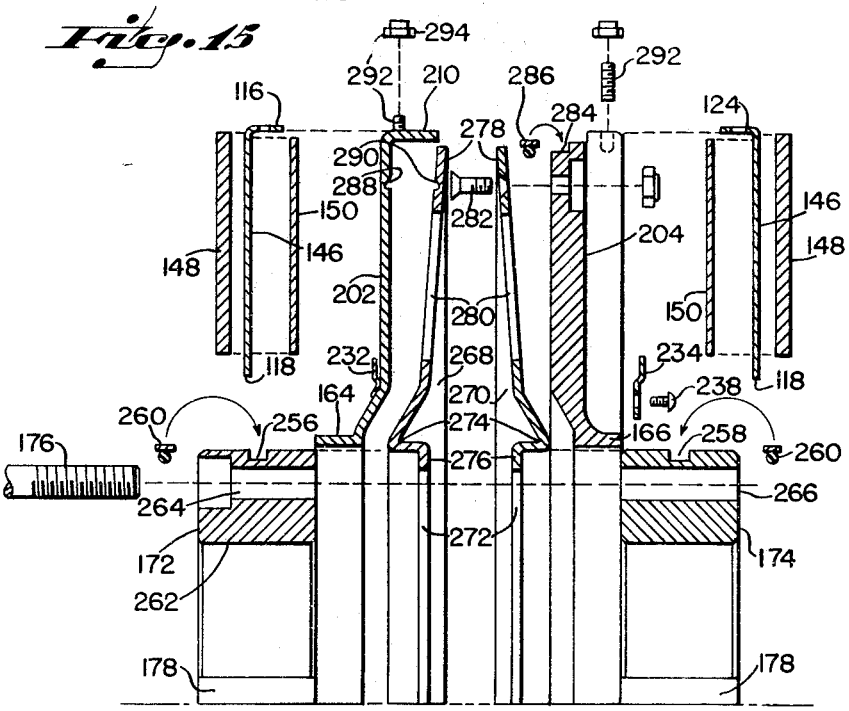
INVENTOR.
LINUS J. RYLAND 
United States Patent Office 3,507,375
Patented Apr. 21, 1970

3,507,375
FLUID OPERATED CLUTCH WITH DISC SPRINGS
Linus J. Ryland, Cincinnati, Ohio, assignor to Charles L. Mitchell, Cincinnati, Ohio
Continuation of application Ser. No. 648,103, June 22, 1967. This application Jan. 29, 1969, Ser. No. 800,333
Int. Cl. F16d 19/00, 13/60, 13/44
U.S. Cl. 192—85   17 Claims

ABSTRACT OF THE DISCLOSURE

The clutch incorporates means for adequate cooling of parts, whether engaged or disengaged, and includes hub driving disc pre-stressed for assuring positive retraction of the lining carriers from the drive member upon clutch disengagement, to avoid frictional drag, noisy operation, and hesitant response in engagement and disengagement. Clutch engagement is effected by pressure of fluid within an expandable chamber enclosing the hub driving discs, without the use of flexible bladders or the like. Individual lining carriers provided are readily replaceable when necessary, without dismantling the clutch. The driven unit of the clutch includes a bi-part hub easily applied to the driven shaft, and arranged to contract upon the driven shaft during assembly to reduce the hub clearance and square the driven parts with the driven shaft axis. A low inertia rating, reduction in size and weight, and compactness, are notable features.

---

This application is a streamlined continuation of Ser. No. 648,103 filed June 22, 1967, and now abandoned.

This invention relates to improvements in a friction clutch, and is directed particularly to a clutch of the internal expanding friction plate type, wherein the plates are movable axially of the clutch shaft rotation, for engagement and disengagement of the clutch.

The objects of the invention are manifold, and include amongst other objects: (1) sustained and enhanced cooling of the clutch, whether engaged or disengaged; (2) high torque and low inertia ratings resulting in fast response; inconsequential frictional drag, precise torque control, and attendant advantages; (3) reductions of clutch size, weight, and manufacturing cost; (4) elimination of backlash, shock, and rapid wearing of parts; (5) ease of lining replacement, with choice of lining materials to meet specific needs; (6) elimination of all need for lubrication; and (7) ability to operate at high speeds without regard to centrifugal force considerations.

Other objects of the invention are: (1) to provide in the improved clutch construction, novel means for securing the driven assembly thereof upon a shaft; (2) to provide improved means for return of the friction plates to a home position at clutch disengagement; (3) to provide for operation of the clutch as a wet unit or a dry unit, or as a water-cooled unit, without change in the size of the unit or in the means for mounting it in operative relationship to a driven shaft and a prime mover; (4) to provide a clutch construction of the character stated, with means whereby smooth and reliable noiseless operation of the clutch is greatly enhanced, and the useful life thereof is materially extended.

Another object of the invention is to provide structural improvements in a clutch of the character stated, adapting the clutch to effective use under adverse conditions of atmospheric temperature extremes, and the presence in the surrounding atmosphere of dust, abrasives, moisture and other elements ordinarily injurious to clutches and their working parts.

A further object of the invention is the elimination of inflatable bladders and kindred flexible elements of like nature, which are vulnerable to the action of atmospheric impurities, and require frequent servicing or replacements.

Another object is to provide an improved clutch having the aforementioned characteristics, which may be used as a brake of high thermal capacity and great durability.

The foregoing and various other objects are attained by the means described herein and illustrated upon the accompanying drawings, in which:

FIG. 1 is a fragmentary side elevational view, partly broken away, showing a clutch embodying the present invention.

FIG. 2 is a cross-sectional view taken substantially upon line 2—2 of FIG. 1.

FIG. 3 is a view substantially similar to the upper half of FIG. 2, but showing a modified construction of the clutch in disengaged condition.

FIG. 4 is a view similar to FIG. 3, showing the clutch engaged.

FIGS. 5 and 6 are, respectively, a fragmentary cross-section and a side elevational view, parts being broken away, showing a still further modification.

Figure 12:
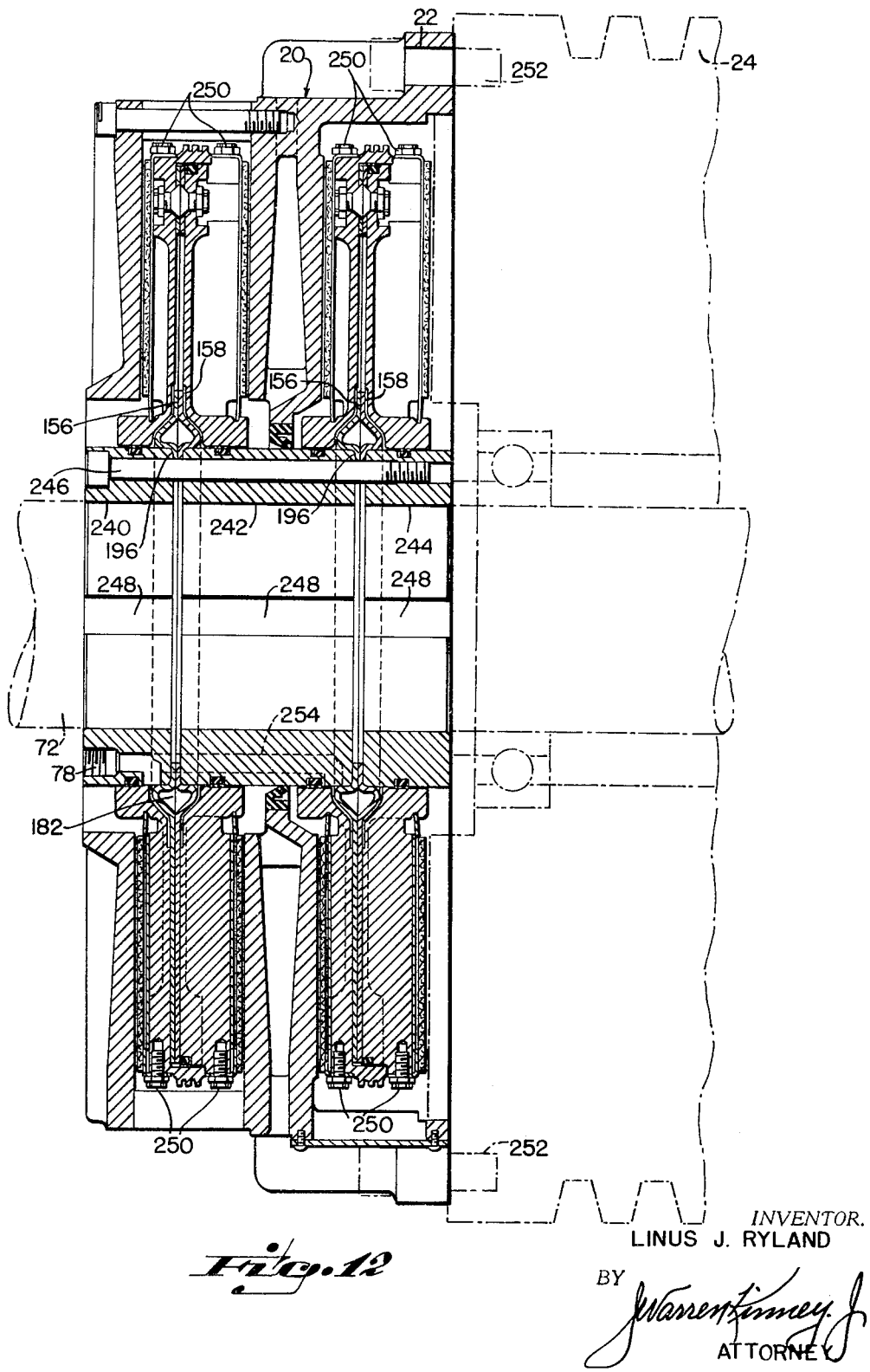

FIGS. 7 and 8 are views similar to FIGS. 5 and 6, respectively, illustrating a slight modification of the structures of FIGS. 5 and 6.

FIG. 9 is a vertical cross-section of a drive member for the clutch, shown in the form of a cylindrical drum-shaped housing.

FIGS. 10 and 11 are views similar to FIG. 9, illustrating two modifications of the drive member or housing.

FIG. 12 is a vertical cross-section showing a clutch comprising two sets of friction plates arranged in tandem relationship within a single housing or drive member.

FIG. 13 is a perspective view of a segmental readily replaceable liner carrier, which embraces a fixed friction pad or liner member shown on one face of the carrier.

FIG. 14 is an exploded view showing the principle clutch elements that may be assembled substantially in accordance with the lower half of FIGS. 7 and 8, with slight modification.

FIG. 15 is a view diagrammatic in form, illustrating a bi-part hub for the clutch, and indicating a novel mode of securing the hub upon a driven shaft.

FIG. 16 is a perspective view of a liner carrier, a modification of FIG. 13.

In each form of the clutch is included a drive member or housing 20 having means, such as bolt holes 22, whereby the drive member may be secured to any suitable prime mover for axially rotating the drive member. By way of example, a prime mover 24 is shown in FIG. 3 as a coupler to be rotated by means of a suitable motor, in conventional manner.

Drive member 20 may be a rotary unit comprising by preference a pair of metallic circular discs 26 and 28 held in spaced substantial parallelism by a series of bolts 30 and spacers 32. The discs may be castings of a suitable metal such as iron or steel, upon which are formed a multiplicity of exterior heat-dissipating fins 34. Each disc 26 and 28 has a smooth inner friction face 36 against which may be expanded the friction plates of an inner driven unit of the clutch, for effecting transmission of motion from the drive member to the driven unit. The discs 26 and 28 may have large central bores 38 and 40, respectively. FIGS. 9, 10 and 11 illustrate several forms of the drive member including driving discs such as 26 and 28.

The drive member of FIG. 9 differs from that of FIG. 2, in that the former includes a peripheral band 42 held by means of clips 44, in position to circumscribe the outer periphery of the drive member, thereby to exclude from the interior of the drive member any air-borne particles of dirt, dust, or other foreign matter. For the same purpose, bore 40 may be provided with an annular flexible sealing ring 46 to bear against a portion of the interior driven unit, as will readily be understood.

The drive member 20 of FIG. 10 may be employed in the case of a wet unit, wherein the driven unit runs in oil or other liquid. Here, one of the discs such as 28 may have a circumferential integral flange 48 making a fluid-tight joint with disc 26 at 50, and interiorly of flange 48 may be located several convolutions of tubing 52 to convey a suitable coolant fluid circulated therein through fittings 54 and 56 connected to opposite ends of the tubing element. A plug 58 closes a filler opening through which fluid may be introduced into and drained from the interior of the drive member, said fluid being retained by means of a flexible annular sealing ring 60 which bears against a part of the driven unit located within the drive member. The bore 38, of course, will be effectively closed by a cover carried by the prime mover.

The drive member 20 of FIG. 11 differs from those of FIGS. 9 and 10, in that the constituent discs 26 and 28 are made hollow to provide chambers 62 in which a coolant may be circulated through fittings 64. The discs in this construction need not carry fins such as 34 of FIG. 9.

In each of FIGS. 9, 10 and 11, the dot-and-dash lines shown interiorly of the drive member, represent generally the driven unit of the clutch. It is to be understood that any of the drive members illustrated by FIGS. 9, 10 and 11, may be employed in constructing the clutch, the selection being dependent upon the service requirements to be met.

The driven unit of the clutch, as illustrated by FIGS. 1 and 2, includes a cylindrical hub 66 provided with a concentric bore 68 in which may be formed a keyway 70 whereby the hub may be keyed to a driven shaft inserted through bore 68. A suitable driven shaft is indicated at 72 upon FIG. 3, and as there shown, the shaft may be provided with an axial bore 74 and a connecting radial bore 76, for conveying air or other fluid under pressure to a chamber within hub 66, through one or more ports 78, for actuating the clutch to effect engagement.

Reverting to FIG. 2, the ports 78 are shown communicating with axial chambers 80 of the hub which in turn communicate with an annular radial outlet 82 formed in the hub. Pressured fluid entering the ports 78 may escape through the radial outlets 82, and such fluid, as will be explained, performs to expand certain friction members against the inner faces 36 of drive member 20, to effect a driving engagement between the drive member and the driven unit of the clutch whenever fluid under pressure is introduced into the hub chamber through shaft bore 74, FIG. 3.

In FIG. 2, the reference characters 84 and 86 denote a pair of hub drive members, which desirably may be substantially flat circular discs, formed preferably of thin resilient sheet metal, and each having an outer periphery and an inner concentric axial bore. At said bore, denoted 88, both of the hub drive members 84 and 86 may be welded or otherwise secured to the outer surface of hub 66 intermediate the branches of fluid outlets 82, with the inner flat surfaces of said drive members substantially in face contact one upon the other. Members 84 and 86 may be rendered more flexible and resilient, if desired, by punching metal therefrom to form perforations of substantial size, as suggested in the lower half of FIG. 2, thereby to absorb shock and vibration under torsional load.

The members or discs 84 and 86 above mentioned may properly be referred to as hub drive members or hub drive discs, since by reason of their connection with the hub at 88 they provide a primary means for transmitting rotation to hub 66 upon engagement of the clutch.

The hub drive discs 84 and 86 are embraced between a pair of pressure plates or discs 90 and 92, each of which has a hub portion 94 loosely encircling the hub 66, so that the hub portions 94 and their respective discs 90 and 92 may have limited shifting movement in opposite directions lengthwise of hub 66. The space between the hub portions of shiftable discs 90 and 92, is seen to be in fluid communication with the branches of fluid pressure outlets 82, 82 so that pressured fluid escaping radially through outlets 82, 82 will act to displace the shiftable discs outwardly from one another. The hub portions 94, 94 of the shiftable discs rest in contact upon annular slipper seals 96, 96 seated in annular grooves of the hub 66 as shown, thereby to preclude loss of pressure outwardly past the seals 96. The seals 96, 96 act also to maintain a substantial clearance between hub 66 and the hub portions 94, 94 of discs or plates 90 and 92, to there avoid metal-to-metal contact.

The chamber between discs 90 and 92, and in which the hub drive discs 84 and 86 are contained, is closed at the extreme outer peripheries of discs 90 and 92, in any suitable manner, as by means of an annular sealing member 98. As shown by way of example, sealing member 98 is partially embedded in a peripheral groove 100 of disc 92, and bears against the inner wall of an overlying flange 102 on the periphery of disc 90 to form a seal. Thus, fluid pressure introduced at port 78 is confined between the discs 90 and 92 by the several sealing members 98, 96, 96, and will act to outwardly expand the discs 90 and 92 from one another.

In the light of the foregoing explanation, the shiftable discs or plates 90 and 92 may be said to constitute axially displaceable walls of an expansible chamber containing the hub drive discs 84 and 86.

Means are provided for anchoring the hub drive discs 84 and 86 to the enclosing discs 90 and 92, respectively, such means being located preferably near the outer margins of the discs. The anchoring means may comprise, by way of example, a headed screw 104 which passes through registering holes in discs 86 and 92, with a nut 106 applied to clamp the discs tightly together. A similar screw 108 having its head opposite the head of screw 104, may be employed to anchor the disc 84 against disc 90. It should be understood that the anchorages mentioned occur at spaced intervals marginally of the discs, as indicated at 106 upon FIG. 1, and will center the discs 90 and 92 about hub 66. Various forms of such anchorages may be employed, as desired.

It may here be noted in connection with FIG. 2, that disc 92 has an overall thickness outwardly of hub portion 94, which extends from disc 86 to a face 110, said face 110 being cut away at a number of locations to a depth indicated by broken line 112, to provide for a copious flow of cooling air radially outwardly from hub 66. The face 110 is adapted to support a plurality of segmental or pie-shaped lining carriers 114 (see FIG. 13). Each lining carrier, according to FIG. 13, may comprise a substantially flat pie-shaped metal plate having at its wider end a flange 116 turned substantially at right angles. The narrow end has a plain edge 118. That face of the carrier plate which is overhung by flange 116, is shown as having a projecting elongate rib 120 which extends between flange 116 and edge 118. As will be explained later, a modification of the liner carrier may omit the rib 120.

Further with reference to FIG. 13, that face of the carrier plate which is opposite the rib 120, has a pad 122 of frictional lining material bonded thereto or otherwise fixed thereon. Flange 116 may be pierced at 124, 124, to receive suitable mounting screws. Adjacent to the openings 124, locking lugs 126 may be struck from the material of the flange to engage the mounting screw heads and thereby prevent accidental loosening of the screws.

With the foregoing understanding of FIG. 13, reference is now made to FIGS. 1 and 2 which show liner carriers mounted upon disc 92 against the face 110 of said disc. The flange 116 of the carrier is fixed to the peripheral edge of disc 92, by means of mounting screws 128, 128, which pass through the flange openings 124 and anchor in the material of the disc. The carriers are radially disposed all around the disc 92 upon its face 110, so that all the lining pads 114 of the carriers normally are closely spaced from the inner friction face 36 of drive member 20, FIG. 2.

The plain edge 118 of each carrier may repose within an annular groove 130 of hub portion 94, to assist the screws 128 in holding the liner carrier in flatwise contact upon the outer face 110 of disc 92.

The ribs 120 of the liner carriers 114 are adapted to serve as keys stabilizing the carriers against sidewise shifting as the liner pads are thrown into frictional contact with the inner face 36 of the drive member. The ribs 120 rest in radial grooves 132 formed in the face 110 of disc 92, one such groove being provided for the rib or key of each liner carrier. It should be understood that means other than the cooperative grooves and ribs above mentioned, may be provided for ensuring stability of the liner carriers, as will later be explained.

To remove a liner carrier for replacement with a new carrier, the serviceman need only remove the two screws 128 (FIG. 2), and withdraw the worn carrier radially outwardly. This procedure causes the carrier end 118 to leave the retaining groove 130 of hub portion 94, while rib 120 slides longitudinally from disc groove 132. Replacement with a new carrier involves merely a reversal of the procedure.

Liner carriers of the type described are applied also to the outer face 134 of disc 90, and may be secured in place by means of the removable screws 136. Liner carriers 114 for disc 90 may be mounted upon said disc precisely as explained above, with the plain end 118 entering a groove 138 in the hub portion 94 of disc 90. Disc 90, like disc 92, may be provided with radial grooves, 140 slidingly receptive of the carrier ribs 120 as heretofore explained.

From the foregoing, it will be understood that in the clutch of FIGS. 1 and 2, a charge of fluid under pressure directed into the hub chamber 82 through ports 78, will enforce a separation of discs 90 and 92 and cause the lining pads 122, 122 of all the carriers to frictionally engage the adjacent inner faces of the discs 26 and 28 of the drive member 20, thereby to transmit rotation of the drive member to hub 66 through the hub drive discs 84 and 86.

The inherent resiliency of the hub drive discs enforces a return of discs 90 and 92 to the normal contracted condition of FIG. 2 as soon as the flow of pressured fluid into the ports 78 is terminated, this resulting in withdrawal of the liner carriers away from the inner faces of the drive member discs 26 and 28, thereby disengaging the clutch to terminate the drive to hub 66 and the driven shaft keyed thereto. The action of the resilient hub drive discs in withdrawing the liner carriers from the friction faces of the drive member, assures freedom of rotation of the drive member without drag upon any of the elements of the driven unit. As a result, the clutch runs cool and noiselessly when disengaged, and its responsiveness is greatly enhanced, along with other advantages apparent to persons conversant with the art.

The reference character 142 at the bottom of FIG. 2, indicates a group of cooling fins formed upon the periphery of disc 90.

In the construction illustrated by FIGS. 1 and 2, the liner carrier of FIG. 16 may be substituted for the liner carrier 114, if desired. The liner carrier of FIG. 16 may be identified generally by the reference numeral 144, and will be seen to comprise a segmental or pie-shaped metal plate 146 having opposed flat faces to which are bonded or otherwise fixed, the friction pads 148 and 150. The pad 148 is a primary friction pad corresponding to the pad 122 of liner carrier 114 of FIG. 13, and pad 150 may be a high-friction resilient pad substantially covering that face of plate 146 which is opposite to the face thereof carrying pad 148. It is proper to consider pad 150 a substitute element replacing the rib 120 of FIG. 13, since the rib 120 and the pad 150 are adapted to perform the same function, which is that of stabilizing the carrier against sidewise displacement relative to the disc upon which the carrier is mounted, namely, disc 90 or disc 92 in FIG. 2.

From the foregoing, it will be understood that friction pads such as 150 render unnecessary the ribs 120 on the liner carriers, and the rib-receptive radial grooves 132 and 140 in discs 90 and 92, respectively. The liner carrier of FIG. 16, like that of FIG. 13 has an inner edge 118 and an outer flange 116, the flange being apertured as at 124 for the reception of mounting screws 128 or 136. Flange 116 may or may not include locking means for the mounting screws, as shown at 126 upon FIG. 13.

It is to be understood that liner carriers of the FIG. 16 type may be substituted for liner carriers of the FIG. 13 type, in all forms of the clutch construction herein disclosed.

In the modified clutch construction of FIGS. 3 and 4, the drive member 20 is shown as one similar to the drive member of FIGS. 1 and 2, or FIG. 9; however, drive members of the type illustrated by FIGS. 10 or 11 might just as well be employed in order to meet differing service requirements or environmental conditions of use. FIG. 4 shows the clutch of FIG. 3 in the engaged or driving condition.

In FIG. 3, the reference numerals 152 and 154 indicate shiftable discs corresponding to the discs 90 and 92 of FIG. 2, which provide an expandable chamber enclosing the hub drive discs 156 and 158. The hub drive discs 156 and 158 constitute a pair, and each may be substantially flat and circular, and formed of a thin resilient sheet metal. By means of screws 160 or other suitable fastening expedients, one hub drive disc is secured to shiftable disc 152, and the other is secured to shiftable disc 154, the points of securement being near the outer peripheral margins of discs 156 and 158.

In a manner previously explained in the description of FIGS. 1 and 2, the shiftable or expansible discs 152 and 154 may be equipped with a multiplicity of radially disposed liner carriers 114 (FIG. 13), which may be detachably secured in place upon the discs 152 and 154 by means of one or more screws 162, 162. Discs 152 and 154 may be provided with hub portions 164 and 166, respectively, each of which is annularly grooved at 168 to receive the inner ends 118 of all the liner carriers. The ribs 120 of the liner carriers are slidably receptive in radial grooves 170 formed in the outer faces of discs 152 and 154, for locking the liner carriers against sidewise displacement relative to said discs, as was explained in the description of FIGS. 1 and 2.

Discs 152 and 154 may be equipped with liner carriers of the FIG. 16 type, using the same mounting screws 162.

The hub portions 164 and 166 of discs 152 and 154 surround and loosely receive a bi-part cylindrical hub, the two parts of which are denoted 172–174. These hub parts may be rigidly connected together by means of screws 176, and may include aligned keyways 178 whereby the hub may be keyed to shaft 72. One of the hub parts may have a port 78 leading to a radial opening 180 for discharge of a pressured fluid, such as air, into the chamber 182 provided between discs 152 and 154. Suitable seals, such as slipper seals 184 and 186, preclude leakage of fluid pressure from chamber 182 along the hub parts 172 and 174. Another seal for the chamber is indicated at 188, for sealing the expansible annular lap joint 190 on the periphery of discs 152 and 154.

The several seals 184, 186, and 188 permit bodily movement of discs 152 and 154 away from one another by pressure of fluid introduced to chamber 182, thereby to expand the friction linings 122 against the inner parallel faces 192 and 194 of drive member 20, as in FIG. 4, to effect engagement of the clutch. When pressure of fluid to chamber 182 is cut off, the clutch parts will be returned to the normal state of disengagement depicted in FIG. 3, by the action of stress in the resilient hub drive plates 156 and 158, as will be explained presently.

It may be noted that both hub drive discs 156 and 158 are ring-shaped, and the inner marginal tongue portions 196 thereof are held in flatwise abutment between the inside faces of hub parts 172 and 174, under the clamping action of one or more screws 176. Closely adjacent to tongue portions 196 of the hub drive discs, the metal of each disc may be formed to provide an outwardly extended annular bead 198. Due to the resilient nature of the metal of the discs, the beads will be inherently resilient also, and will tend to yieldingly bias the major portions of the discs toward flatwise contacting relationship, as depicted by FIG. 3.

When the driven unit is fluid expanded to effect clutch engagement, as in FIG. 4, outward separation of discs 152 and 154 distorts the resilient discs 156 and 158, thereby to increase the stress in discs 156 and 158 tending to flatten them. Accordingly, when the pressure of operating fluid is cut off, stress in the discs 156 and 158 acts to return to normalcy all of the previously expanded parts (see FIG. 3), so that the drive member 20 may rotate free of drag against linings 122. Cooling fins are indicated at 200, upon FIGS. 3 and 4.

The sealing members at 184, 186 and 188 are shown more or less conventionally, with the understanding that commercial slipper seals are available for application here to perform the required service.

The bi-part hub 172–174 will be treated in greater detail hereinafter, concerning its adjustability relative to driven shaft 72.

FIGS. 5 and 6 illustrate a modification of the structure shown by FIGS. 3 and 4, above described. It will be noted that the shiftable or expandable discs, denoted 202 and 204 in FIG. 5, have the frictional liner pads 206 and 208 bonded directly thereto, without the intervention of a detachable liner carrier such as 114 of FIG. 13, or 144 of FIG. 16. Also by way of distinction, the shiftable or expandable disc 202 in FIG. 5 is formed as a sheet metal stamping, rather than as a casting according to FIG. 3. As a stamping, the disc 202 may be annularly flanged at 210 to overlie the peripheral edge of cast metal disc 204, and to seal against a slipper seal 212 carried by the periphery of disc 204. Also in FIG. 5, a screw connection 214 similar to the connection at 104–106 of FIG. 2, may secure the hub drive disc 216 to shiftable disc 204, whereas the other hub drive disc 218 may be welded or otherwise secured to stamped disc 202, at the location 220.

Except for the distinctions noted in the paragraph next above, the clutch construction of FIGS. 5 and 6 and mode of operation may be considered identical to that of FIGS. 3 and 4. In FIG. 5, only a portion of the drive member 20 is illustrated, with the understanding that the drive member may take any of the forms illustrated by FIGS. 9, 10 and 11, or any desired variations thereof.

FIGS. 7 and 8 illustrate a clutch construction similar to that of FIGS. 5 and 6, with the exception that the shiftable or displaceable discs 222 and 224 corresponding to discs 202 and 204, each support a detachable liner carrier 226 and 228. Liner carriers 226 and 228 may be either the FIG. 13 type, or the FIG. 16 type, mounted and secured in place upon discs 222 and 224 by screws 230 in a manner previously explained. Clip members 232 and 234 secured to the discs 222 and 224, slidingly receive the narrow inner ends 118 of the liner carriers, for holding said ends of the carriers against the discs. Such clip members may be in the form of annular rings 234, FIG. 8, secured to the disc by means of screws 238, (see also FIG. 14). Friction pads bonded or otherwise fixed upon the liner carriers, are indicated at 236 in FIGS. 7 and 8.

FIG. 12 illustrates a dual clutch, wherein the single drive member 20 houses two complete driven units of the clutch, arranged in tandem upon driven shaft 72. Although the driven units in FIG. 12 are shown as corresponding to the driven unit of FIG. 3, any of the modified driven units herein disclosed might be employed in the dual clutch.

The hub parts are three in number, identified by the reference characters 240, 242 and 244, and may be secured in alignment upon driven shaft 72 by long screws 246. The keyways 248 of the several hub parts are aligned to receive a long key which keys said parts to shaft 72. The flat margins 196 of all the hub drive discs 156, 158, are clamped between the hub parts 240, 242 and 244, by the clamping force of screws 246, about six such screws being provided for the purpose. The hub drive discs 156, 158 are held under stress to ensure full disengagement of the clutches, as was explained in the description of FIG. 3 and 4.

Further with reference to FIG. 12, the prime mover 24 is shown as a multiple belt pulley merely by way of example, with the understanding that any suitable form of prime mover might be substituted for the pulley, in practice. The detachable liner carreirs of FIG. 12 may be of either type illustrated by FIGS. 13 and 16, and secured in place upon the slidable or expandable discs by means of screws 250. Screws 252 may be employed to secure the drive member 20 to the prime mover.

The dual clutch of FIG. 12 is adapted for heavy duty and highly sensitive response applications. As will readily be appreciated, it is possible to embody more than two tandem driven units in a single drive housing, should occasion demand it. The reference character 78 denotes a port for delivering pressured actuating fluid to one of the tandem driven units. The remaining driven unit may be pressured separately though a second passageway 254 in hub sections 240 and 242, preferably in advance of pressuring the unit at the left in FIG. 12. Thus, the unit at the right may initiate the driving of shaft 72, whereas the left hand unit serves to immediately thereafter complete or lock-up the drive to the shaft. When so used, the friction material of the right hand unit friction pads may be of a type highly resistant to wear under high speed clutch engagement, whereas that of the left hand unit may have a higher coefficient of friction more suitable for maintaining a non-slip drive. If desired, the unit at the right may run in oil or other liquid.

FIG. 14 is an exploded view showing how a clutch of the present invention may be assembled, particularly as to the driven unit thereof. The cylindrical elements of the bi-part hub to be mounted upon the driven shaft, are identified by the reference characters 172 and 174 as in FIGS. 3 and 7. Annular grooves 256 and 258 are receptive of high-temperature low-friction slipper seals of ring formation, a cross-section of which is shown conventionally at 260.

Hub part 172 may be bored at several locations equidistant from the axis of main bore 262, to provide openings 264 receptive of screws 176. Corresponding bores 266 in hub part 174 may be internally screw-threaded to receive the threaded ends of screws 176. The screws may connect the hub parts as in FIG. 15.

Hub drive discs 268 and 270 preferably are circular and may be pressed from resilient high-tensile metal blanks to a substantial dish shape, with a large central aperture 272. Annular outwardly extending beads 274 may be formed at a distance from apertures 272, to provide flat marginal portions 276 defining the apertures. The outer or peripheral margins of the discs are denoted 278. Cut-outs 280 may be formed in the flat portions of the discs intermediate the beads 274 and the peripheral margins 278, thereby to reduce weight and provide for radial deflection in the discs helpful for absorbing vibration and shock in the operation of the clutch.

When the hub sections 172 and 174 are brought together for clamping therebetween the flat marginal tongue portions 276 of the discs, as shown in the upper half of FIG. 15, the flat portions of the discs outwardly of beads 274 will be brought itno substantial flatwise contact, under stress, to assume the relationship illustrated by FIG. 3. At a short distance from the periphery of disc 270, a screw or other fastener 282 may be employed to secure said disc to a shiftable or expandable disc 204 (see FIG. 5). Said disc 204 has a hub portion 166 to surround and rest upon the annular seal member 260 of hub part 174.

A second shiftable or expandable disc 202, preferably in the form of a rigid metal stamping, cooperates with disc 204 to enclose a pair of hub drive discs 268 and 270. Disc 202 has a hub portion 164, as in FIG. 5, to surround and rest upon the anular seal member 260 carried in the groove 256 of hub part 172. At its outer periphery, disc 202 may carry a lateral annular flange 210, to overlie a shoulder 284 of disc 204, and with the aid of an annular slipper seal 286 applied to shoulder 284, will form a substantially fluid-tight joint of limited slidability axially of the hub 172–174.

At the depressions 288 and 290, a weld may be applied for securing the disc 268 in flatwise contact against the adjacent face of disc 202. The resultant assembly will approximate the showing of FIG. 5.

For mounting of a liner carrier 146 detachably upon disc 202, said disc may be provided with a welded-on screw stud 292 which is receptive of the perforated flange 116, FIG. 16, and an open clip member 232 welded or otherwise fixed upon the outer face of disc 202 is slidingly receptive of the edge 118 of the liner carrier. The liner carrier has opposite flat faces to which may be bonded the friction pads 148 and 150. A nut 294 may secure the liner carrier to stud 292.

Similarly as above explained, a liner carrier of FIG. 16 may be mounted upon disc 204, utilizing a stud 292 and a clip member 234. As will be understood, a multiplicity of liner carriers will be applied to discs 202 and 204 in the manner stated, and as suggested by FIG. 8.

With the driven unit assembled and mounted upon a driven shaft according to FIGS. 3 and 4, stress inherent within the hub drive discs will tend always to yieldingly urge the friction linings out of contact with drive member 20, (FIG. 3). The force of stress, however, will be overcome by introduction of pressured fluid into chamber 182 for engaging the clutch incident to expanding the shiftable discs which enclose the hub drive discs, all as previously explained in the description of FIGS. 3 and 4.

Reverting to FIG. 15, it is noted that hub parts 172 and 174 are somewhat distortable or malleable, or may be cocked relative to shaft 72, by very thoroughly tightening the screws 176. The cocked or distorted condition is shown, somewhat exaggerated, at the lower half of FIG. 15, and will be seen to induce a contraction and gripping of the hub parts upon the shaft. As a result, clearance between the shaft and bores of the hub parts automatically assume a position of exact concentricity with the shaft axis. The distortion referred to results from the limited extent to which the flat margins 276 of discs 268 and 270 and enter between the hub parts, as shown by FIG. 15. Otherwise stated, the hub parts fulcrum about the disc portions 276 when screws 176 are thoroughly tightened. In the upper half of FIG. 15 the screw 176 is shown only partially tightened, whereas the lower half of the figure, the result of thoroughly tightening the screw is indicated, with some degree of exaggeration.

The above described distortion and contraction of the hub parts upon the driven shaft assures balance and squareness of the driven unit and its parts with the shaft, this resulting in noiseless and vibrationless clutch operation. It also serves to permit a desirable initial loose fitting of the hub parts to the shaft during assembly of the clutch, with resultant savings of time, labor and expense.

In conclusion, it may be noted that the clutch construction as herein disclosed reduces to an absolute minimum all metal-to-metal frictional wear, and eliminates the use of flexible bladders and the like which in other clutch structures constitute a source of endless trouble in servicing. Also, provision is made for positive retraction of the liner-carrying elements at clutch disengagement, to eliminate drag, heating, and hesistant responsiveness of clutch operation. The design of the clutch is such that size and weight are minimized without sacrificing torque values, and effective cooling is assured resulting in trouble-free economical service. Many additional advantages are realized by constructing a clutch as herein taught, and such advantages will readily be appreciated and recognized by persons skilled in the art to which the invention appertains.

The friction lining materials employed are subject to a wide selection, and any change in selection may be easily and inexpensively realized due to the ease with which the liner carriers of the invention may be removed and replaced, carrying the lining material selected.

In all forms of the clutch disclosed, delivery of pressured actuating fluid is selective, and controllable either manually or automatically to effect clutch engagement and disengagement.

In constructing the clutch, care should be exercized to avoid closely fitting the hub portions of the shiftable discs upon the driven hub with metal to metal contact. For example in FIG. 3, the hub portions 164 and 166 do not have physical contact with driven hub 174. Concentricity of the shiftable discs with hub 174 is maintained by reason of the fastener connections at 160, 160, which suspend the shiftable discs upon the fixed hub drive members 184, 186, and prevents wear, frictional drag, and noise at this location. It also facilitates assembly of the clutch. The foregoing applies to all the modifications herein disclosed.

As was mentioned previously herein, the structure provides for a copious movement of cooling air radially outwardly from the driven hub, behind and between the several lining carriers and the adjacent friction faces of the drive member, to effectively dissipate heat generated within the clutch. As FIG. 1 clearly indicates, the several lining carriers 114 preferably are spaced from one another at their side edges. Also, those faces of the lining carriers which are adjacent to the shiftable plates or discs upon which the carriers are mounted, have the advantage of exposure to the current of cooling air radiating outwardly from the region of the driven hub.

It is to be understood that various modifications and changes may be made in the structural details of the device, within the scope of the appended claims, without departing from the spirit of the invention.

What is claimed is:

1. A clutch for application to a driven shaft and a prime mover, and comprising in combination: a drive member rotatable by the prime mover and including a pair of spaced substantially parallel inner friction faces; a driven cylindrical hub for fixation axially upon the driven shaft, said hub having a peripheral cylindrical surface concentric with the shaft axis; a pair of pressure plates concentric with said shaft and axially shiftable relative to said cylindrical surface of the driven hub; a pair of flexible hub drive members, and means fixing said hub drive members to the pressure plates and to the hub for rotation therewith in a plane normal to the shaft axis; said pressure plates including walls in sliding engagement forming a fluid-tight expansible chamber wholly confining and concealing said hub drive members; means fixing said hub drive members each to one of the pressure plates, said shiftable pressure plates each having an outer face normal to the driven shaft axis, with said outer faces in close substantial parallelism with the inner friction faces of the drive member; friction pads fixed upon the outer faces of the shiftable pressure plates, said pads being movable with said pressure plates toward and from the inner friction faces of the drive member; and actuating means operable to axially move the shiftable pressure plates, for disposing the attached friction pads into and out of frictional driving contact with the inner faces of the drive member.

2. The combination as specified by claim 1, wherein said hub drive members are pre-stressed to constantly urge the shiftable pressure plates thereto affixed, in a direction tending to remove the friction pads from contact with the inner faces of the drive member.

3. The combination as specified by claim 1, wherein is included a multiplicity of friction pad carriers upon which said friction pads are mounted, and means for removably fixing said carriers upon the shiftable pressure plates.

4. The combination as specified by claim 3, wherein the removable friction pad carriers are displaceable radially in removing said carriers from the shiftable pressure plates.

5. The combination as specified by claim 3, wherein the hub drive members are pre-stressed to constantly yieldingly urge the shiftable pressure plates in opposite directions tending to withdraw the friction pads axially from contact with the inner friction faces of the drive member.

6. The combination as specified by claim 2, wherein is included sealing means adjacent to the peripheries of the shiftable pressure plates, and sealing means between the driven hub and each of said pressure plates providing the aforesaid fluid-tight expandsible chamber confining the hub driving members, and wherein said actuating means comprises means for directing into the chamber a fluid under pressure to expand said chamber by moving said shiftable pressure plates and said friction pads toward the inner friction faces of the drive member.

7. The combination as specified by claim 6, wherein is included a multiplicity of carriers upon which are fixed the friction pads as individuals; and means detachably mounting said carriers individually upon the outer faces of the shiftable pressure plates, for bodily displacement of said carriers in a direction substantially radially outwardly of said pressure plates.

8. The combination as specified by claim 7, wherein at least one of the carriers comprises an elongate flat plate having opposite faces, an outer end portion, and an inner edge portion, one of said plate faces being substantially covered by a friction pad thereto attached; a laterally directed flange on the outer end portion of the carrier plate to overlie the periphery of one of said pressure plates; and means on the remaining plate face to frictionally grip a portion of the outer face of a pressure plate; said carrier mounting means including a displaceable fastener securing the flange of the carrier upon the periphery of a pressure plate, and a clip member on the pressure plate slidably receptive of the inner edge portion of the carrier.

9. The combination as specified by claim 8, wherein the inner friction faces of the drive member define a coolant chamber enclosing the hub drive members, the shiftable pressure plates, the friction pad carriers, and portions of the driven hub against which the pressure plates are sealed by the sealing means aforesaid.

10. The combination as specified by claim 1, wherein the driven hub comprises a pair of cylindrical hub sections arranged coaxially upon the driven shaft, said hub sections having end faces opposed to one another; and wherein the aforesaid means fixing the hub drive members to the hub comprises a radial tongue on each hub drive member, said tongues being interposed between the opposed end faces of the hub sections, and means for axially drawing the hub sections toward one another to clamp the tongues rigidly between the opposed end faces of said hub sections.

11. The combination as specified by claim 10, wherein the hub sections are of malleable metal and provided with pairs of aligned holes drilled at right angles to the opposed end faces of the hub sections, said holes being parallel to and spaced equidistantly from the common axis of the hub sections; and the last-mentioned means comprises a plurality of clamp screws, one in each pair of holes, for drawing the hub sections toward one another upon the tongues, said tongues terminating at a lesser distance from the common axis of the hub sections than the distance between said common axis and the axes of the clamp screws, whereby thorough tightening of the clamp screws induces distortion and contraction of the hub sections radially inwardly upon the driven shaft to minimize clearance between said shaft and the hub sections mounted thereon.

12. The combination as specified by claim 11, wherein the hub drive members are pre-stressed to constantly yieldingly urge the shiftable pressure plates in opposite directions tending to withdraw the friction pads axially from contact with the inner friction faces of the drive member.

13. The combination as specified by claim 12, wherein is included sealing means adjacent to the peripheries of the shiftable pressure plates, and sealing means between each driven hub section and one of said pressure plates, providing a substantially fluid-tight expansible chamber enclosing the hub drive members; and means for directing into the chamber a fluid under pressure to expand said chamber by moving said shiftable pressure plates and said friction pads toward the inner friction faces of the drive member.

14. The combination as specified by claim 13, wherein is included a multiplicity of carriers upon which are fixed the friction pads as individuals; and means detachably mounting said carriers upon the outer faces of the shiftable pressure plates, for bodily removal of said carriers from said pressure plates.

15. The combination as specified by claim 14, wherein said carriers are displaceable for removal in a direction substantially radially outwardly of said shiftable pressure plates.

16. The combination as specified by claim 10, wherein at least one of the hub drive members is of resilient metal and includes an annular bead pressed therein adjacent to the tongue, for storing stress energy induced within said resilient hub drive member incident to rigid clamping of the tongue between the opposed end faces of the hub sections.

17. The combination as specified by claim 11, wherein at least one of the hub drive members is of resilient metal and includes an annular bead pressed therein adjacent to the tongue, for storing stress energy induced within said resilient hub drive member incident to rigid clamping of the tongue between the opposed end faces of the hub sections.

References Cited

UNITED STATES PATENTS

| | | | |
|---|---|---|---|
| 2,710,078 | 6/1955 | Cardwell | 192—113.2 X |
| 2,765,061 | 10/1956 | Fawick. | |
| 2,913,081 | 11/1959 | Rudisch | 192—107 X |
| 3,311,205 | 3/1967 | Suppes et al. | |
| 3,326,344 | 6/1967 | Hackforth. | |
| 3,353,638 | 11/1967 | Smoll. | |

BENJAMIN W. WYCHE, III, Primary Examiner

U.S. Cl. X.R.

182—152; 192—52, 87.11, 89, 107, 113; 287—52.07